United States Patent
Henry et al.

(10) Patent No.: US 7,917,568 B2
(45) Date of Patent: Mar. 29, 2011

(54) X87 FUSED MULTIPLY-ADD INSTRUCTION

(75) Inventors: G. Glenn Henry, Austin, TX (US);
Timothy A. Elliott, Austin, TX (US);
Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 917 days.

(21) Appl. No.: 11/781,754

(22) Filed: Jul. 23, 2007

(65) Prior Publication Data
US 2008/0256162 A1 Oct. 16, 2008

Related U.S. Application Data

(60) Provisional application No. 60/910,985, filed on Apr. 10, 2007.

(51) Int. Cl.
*G06F 7/38* (2006.01)
(52) U.S. Cl. .................................................... 708/523
(58) Field of Classification Search .................. None
See application file for complete search history.

(56) References Cited

U.S. PATENT DOCUMENTS

| | | | | |
|---|---|---|---|---|
| 6,542,916 | B1 * | 4/2003 | Hinds et al. | 708/501 |
| 7,461,117 | B2 * | 12/2008 | Trong et al. | 708/501 |
| 7,499,962 | B2 * | 3/2009 | Tang et al. | 708/501 |
| 2008/0256161 | A1 * | 10/2008 | Quinnell et al. | 708/501 |
| 2009/0248779 | A1 * | 10/2009 | Brooks et al. | 708/523 |
| 2009/0265409 | A1 * | 10/2009 | Peleg et al. | 708/501 |

* cited by examiner

*Primary Examiner* — David H Malzahn
(74) *Attorney, Agent, or Firm* — E. Alan Davis; James W. Huffman

(57) ABSTRACT

An x87 fused multiply-add (FMA) instruction in the instruction set of an x86 architecture microprocessor is disclosed. The FMA instruction implicitly specifies the two factor operands as the top two operands of the x87 FPU register stack and explicitly specifies the third addend operand as a third x87 FPU register stack register. The microprocessor multiplies the first two operands and adds the product to the third operand to generate a result. The result is stored into the third register and the first two operands are popped off the stack. In an alternate embodiment, the third operand is also implicitly specified as being stored in the register that is two registers below the top of stack register; the result is also stored therein. The instruction opcode value is in the x87 opcode range.

15 Claims, 3 Drawing Sheets x87 FPU FMA Logic

X87 FUSED MULTIPLY-ADD INSTRUCTION

CROSS REFERENCE TO RELATED APPLICATIONS

This application claims priority to U.S. Provisional Application No. 60/910,985, filed Apr. 10, 2007.

BACKGROUND OF THE INVENTION

Field of the Invention

The present invention relates in general to the field of floating-point instruction execution in a pipelined microprocessor, and particularly to execution of a fused multiply-add instruction within the x87 instruction set architecture.

Some microprocessors, microcontrollers, and digital signal processors include a floating-point (FP) fused multiply-add instruction (FMA) in their instruction sets. An FP FMA instruction multiplies two FP operands (A and B) and adds the product to a third FP operand (C) to generate a result, thus:

$$FMA(A,B,C)=(A*B)+C.$$

A microprocessor that includes an FP FMA instruction in its instruction set may improve the speed and accuracy of many important computations that involve the accumulation of products—such as a matrix multiplication, dot product calculation, or polynomial expansion—over a microprocessor that requires the program to perform a distinct multiply instruction followed by a distinct add instruction. The FP FMA may improve the accuracy because the FP FMA can generate the result by performing a single rounding of the result rather than the two rounds that must be performed in the case of a distinct multiply instruction followed by a distinct add instruction. In the latter case, the product of the multiply is rounded; whereas, the FP FMA instruction need not round the product before adding it to the third operand. Additionally, the FP FMA instruction may improve the speed because, depending upon the micro-architecture of the microprocessor, the microprocessor may be able to execute a single instruction faster than it executes two instructions.

Examples of popular microprocessor that include an FP FMA instruction include the PowerPC, Intel® Itanium™, and Sun Microsystems® SPARC processor families. However, x86 architecture microprocessors, by far the most popular contemporary microprocessors, unfortunately do not currently include an FP FMA instruction in their instruction sets. Therefore, what is needed is an x86 FP FMA instruction.

BRIEF SUMMARY OF INVENTION

The present invention provides an x87 fused multiply-add (FMA) instruction for storage in a computer system memory and for execution by an x86 architecture microprocessor having an x87 floating-point unit (FPU) register stack. The instruction includes first and second operands, implicitly specified as stored in first and second registers of the register stack. The first and second registers are the top two registers of the register stack. The instruction also includes a third operand, explicitly specified in the instruction as stored in a third register of the register stack. The FMA instruction instructs the microprocessor to multiply the first and second operands to generate a product, and to add the third operand to the product to generate a result.

In another aspect, the present invention provides an x86 architecture microprocessor having an x87 floating-point unit (FPU) with an x87 register stack. The microprocessor includes an instruction decoder that decodes an x87 fused multiply-add (FMA) instruction of the microprocessor instruction set. The FMA instruction has first and second operands, implicitly specified as stored in first and second registers of the register stack. The first and second registers are the top two registers of the register stack. The FMA instruction also has a third operand, explicitly specified in the instruction as stored in a third register of the register stack. The microprocessor also includes a multiplier, coupled to the register stack, which multiplies the first and second operands to generate a product, in response to the FMA instruction. The microprocessor also includes an adder, coupled to the multiplier, which adds the third operand to the product to generate a result, in response to the FMA instruction.

In another aspect, the present invention provides a method for executing an x87 fused multiply-add (FMA) instruction in an x86 architecture microprocessor having an x87 floating-point unit (FPU) with an x87 register stack. The method includes decoding the FMA instruction of the microprocessor instruction set. The FMA instruction has first and second operands, implicitly specified as stored in first and second registers of the register stack. The first and second registers are the top two registers of the register stack. The FMA instruction also has a third operand, explicitly specified in the instruction as stored in a third register of the register stack. The method also includes multiplying the first and second operands to generate a product, after the decoding. The method also includes adding the third operand to the product to generate a result, after the multiplying.

In another aspect, the present invention provides a computer program product for use with a computing device, the computer program product including a computer usable storage medium with computer readable program code embodied in the medium for providing an x86 architecture microprocessor having an x87 floating-point unit (FPU) with an x87 register stack. The computer readable program code includes first program code for providing an instruction decoder that decodes an x87 fused multiply-add (FMA) instruction of the microprocessor instruction set. The FMA instruction has first and second operands, implicitly specified as stored in first and second registers of the register stack. The first and second registers are the top two registers of the register stack. The FMA instruction also has a third operand, explicitly specified in the instruction as stored in a third register of the register stack. The computer readable program code also includes second program code for providing a multiplier, coupled to the register stack, which multiplies the first and second operands to generate a product, in response to the FMA instruction. The computer readable program code also includes third program code for providing an adder, coupled to the multiplier, which adds the third operand to the product to generate a result, in response to the FMA instruction.

In another aspect, the present invention provides a method for providing an x86 architecture microprocessor having an x87 floating-point unit (FPU) with an x87 register stack. The method includes providing computer-readable program code describing the microprocessor. The program code includes first program code for providing an instruction decoder that decodes an x87 fused multiply-add (FMA) instruction of the microprocessor instruction set. The FMA instruction has first and second operands, implicitly specified as stored in first and second registers of the register stack. The first and second registers are the top two registers of the register stack. The FMA instruction also has a third operand, explicitly specified in the instruction as stored in a third register of the register stack. The program code also includes second program code for providing a multiplier, coupled to the register stack, which multiplies the first and second operands to generate a product, in response to the FMA instruction. The program code also includes third program code for providing an adder, coupled to the multiplier, which adds the third operand to the product to generate a result, in response to the FMA instruction. The method also includes transmitting the computer-readable program code as a computer data signal on a network.

In another aspect, the present invention provides a x87 fused multiply-add (FMA) instruction for storage in a computer system memory and for execution by an x86 architecture microprocessor having an x87 floating-point unit (FPU) register stack. The FMA instruction includes first, second, and third operands, implicitly specified as stored in first, second, and third registers of the register stack. The first, second, and third registers are the top three registers of the register stack. The FMA instruction instructs the microprocessor to multiply the first and second operands to generate a product, to add the third operand to the product to generate a result, and to store the result into the third register.

In another aspect, the present invention provides an x86 architecture microprocessor having an x87 floating-point unit (FPU) with an x87 register stack. The microprocessor includes an instruction decoder, configured to decode an x87 fused multiply-add (FMA) instruction of the microprocessor instruction set. The FMA instruction has first, second, and third operands, implicitly specified as stored in first, second, and third registers of the register stack. The first, second, and third registers are the top three registers of the register stack. The microprocessor also includes a multiplier, coupled to the register stack, which multiplies the first and second operands to generate a product, in response to the FMA instruction. The microprocessor also includes an adder, coupled to the multiplier, which adds the third operand to the product to generate a result for storing in the third register, in response to the FMA instruction.

DETAILED DESCRIPTION OF THE INVENTION

Figure 1:
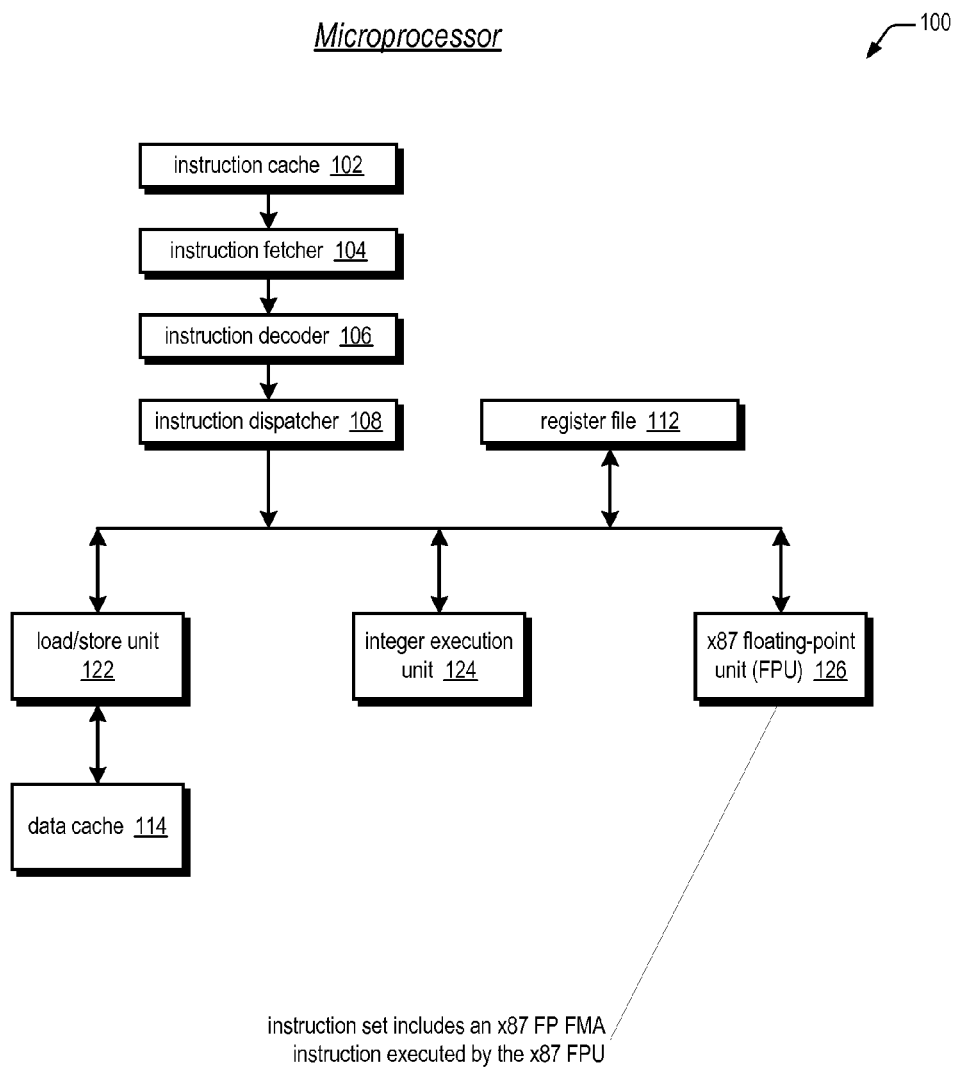
FIG. 1 is a block diagram illustrating an x86 architecture microprocessor that includes in its instruction set an x87 FMA instruction according to the present invention.

Referring now to FIG. 1, a block diagram illustrating an x86 architecture microprocessor 100 that includes in its instruction set an x87 FMA instruction according to the present invention is shown. The microprocessor 100 includes an instruction cache 102 that caches program instructions fetched from a system memory coupled to the microprocessor 100, including x87 FMA instructions according to the present invention. The microprocessor 100 also includes an instruction fetcher 104, coupled to the instruction cache 102, that fetches program instructions from the instruction cache 102 and the system memory. The microprocessor 100 also includes an instruction decoder 106, coupled to the instruction fetcher 104, which decodes the fetched program instructions of the instruction set of the microprocessor 100, such as x87 FMA instructions described herein according to the present invention. An instruction dispatcher 108, coupled to the instruction decoder 106, dispatches the instructions to one of multiple functional units coupled to the instruction dispatcher 108. In one embodiment, the instruction decoder 106 is an instruction translator that translates the fetched program instructions into lower-level microinstructions that are dispatched by the instruction dispatcher 108 to the functional units. The functional units, or execution units, include an integer execution unit 124, a load/store unit 122, and an x87 floating-point unit (FPU) 126. Other embodiments are contemplated in which other functional units are included, such as a separate floating-point add unit, an MMX unit, an SSE unit, and/or SSE2 unit. The microprocessor 100 also includes a register file 112 that supplies instruction operands to the functional units and receives instruction results from the functional units. The microprocessor 100 also includes a data cache 114, coupled to the load/store unit 122, which caches data from the system memory. The instruction dispatcher 108 dispatches x87 FMA instructions of the present invention to the x87 FPU 126. The x87 FPU 126 and its operation while executing an FMA instruction is shown in more detail with respect to FIGS. 2 and 3.

The format of the FMA instruction is also shown in FIG. 1. The FMA instruction includes an opcode 132 that uniquely identifies the x87 FMA instruction from the other instructions in the microprocessor 100 instruction set. The opcode 132 value is within the x87 opcode range. In one embodiment, the x87 FMA instruction has four possible opcode values: 0xD9D4, 0xD9D5, 0xD9D6, 0xD9D7. In one embodiment, the x87 FMA instruction also explicitly specifies the third FMA instruction operand, i.e., the addend (referred to herein as "C"). According to the standard x87 nomenclature, the third operand is also referred to herein according to the common notation ST(i), which denotes a register in the x87 FPU register stack 202 (shown in FIG. 2) that is "i" registers below the top of the register stack 202, where "i" is a value between 0 and 7, inclusive. The FMA instruction implicitly specifies the other two operands as the two top registers in the x87 FPU register stack 202.

Figure 2:
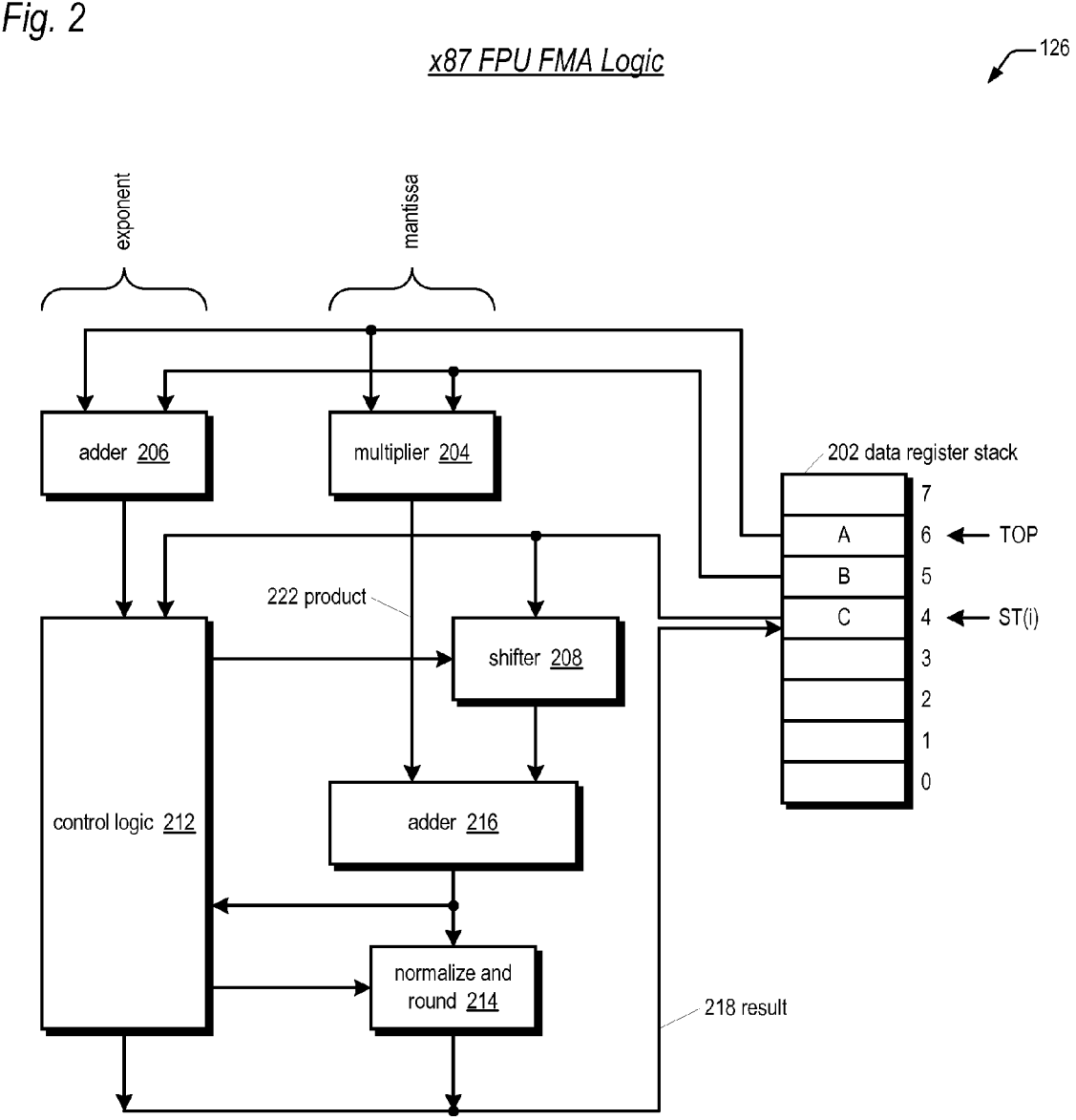
FIG. 2 is a block diagram illustrating portions of the x87 FPU of FIG. 1 for executing the FMA instruction according to the present invention.

Referring now to FIG. 2, a block diagram illustrating portions of the x87 FPU 126 of FIG. 1 for executing the FMA instruction according to the present invention is shown. The x87 FPU 126 includes the well-known x87 data register stack 202. The x87 FPU register stack 202 includes eight 80-bit registers arranged as a stack. Each register in the x87 FPU register stack 202 includes a 64-bit mantissa field, a 15-bit exponent field, and a sign bit. A top-of-stack (TOS) pointer points to the register at the top of the x87 FPU register stack 202, indicated as TOP in FIG. 2. The TOS pointer is included in a status register (not shown) of the x87 FPU 126. In the example of FIG. 2, the TOP register is the register at index 6. Thus, the two implicitly specified operands, i.e., the factors denoted herein as "A" and "B," are located in registers 6 and 5, respectively, i.e., in the register at the top of the x87 FPU register stack 202 (commonly denoted ST(0)) and the register immediately below the top of the x87 FPU register stack 202 (commonly denoted ST(1)), respectively. In the example of FIG. 2, the added operand "C" is shown in register 4, i.e., immediately below the "B" operand in the x87 FPU register stack 202. However, it should be understood that in the embodiment of FIG. 2, the programmer may explicitly specify another register of the x87 FPU register stack 202 as the third operand other than the register immediately below the "B" operand.

The x87 FPU 126 includes a multiplier 204 that multiplies the mantissa of the factors "A" and "B" to generate a 128-bit product 222 that is provided as a first input to an adder 216. The x87 FPU 126 also includes a second adder 206 that receives the exponent of the factors "A" and "B" and adds them to generate a sum that is provided to control logic 212. The control logic 212 also receives the exponent of the addend operand "C." A shifter 208 receives the mantissa of the "C" operand and shifts it as instructed by a control signal provided by the control logic 212. The output of the shifter 208 is provided as the second input to the adder 216. The control logic 212 controls the shifter 208 to shift the "C" mantissa based on the "C" exponent and the sum of the "A" and "B" exponents such that the adder 216 adds the corresponding significant bits of the product 222 and the "C" mantissa to generate a sum. Although FIG. 2, by way of example, shows the multiplier 204 and adder 206 coupled to receive registers 5 and 6 of the x87 FPU register stack 202 and shows the shifter 208 and control logic 212 coupled to receive register 4, the x87 FPU 126 includes multiplexing logic (not shown) that receives the contents of each of the registers in the x87 FPU register stack 202 and selects the appropriate register contents to supply to the multiplier 204, adder 206, shifter 208, and control logic 212 based on the value of the TOS pointer and the explicit operand of the FMA instruction.

The adder 216 provides the sum to a normalize and round circuit 214. The normalize and round circuit 214 normalizes and then rounds the sum to the standard x87 sign, exponent, mantissa format to provide a mantissa of a result 218 of the FMA instruction, based on a control signal provided to the normalize and round circuit 214 by the control logic 212. The control logic 212 generates the control signal based on the "C" exponent and the sum of the "A" and "B" exponents and based on the carry output of the adder 216. The control logic 212 also outputs an exponent and sign of the result 218 of the FMA instruction. The result 218 is stored in the register explicitly specified by the FMA instruction holding the "C" operand.

Figure 3:
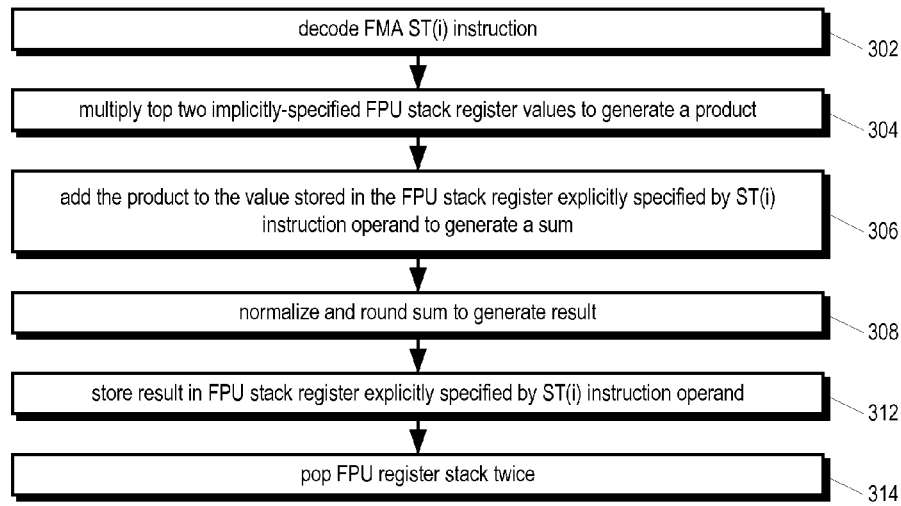
FIG. 3 is a flowchart illustrating operation of the microprocessor of FIG. 1 to execute an FMA instruction according to the present invention.
Figure 3:
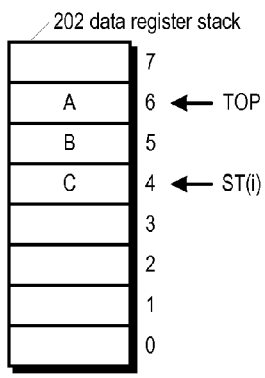
Figure 3:
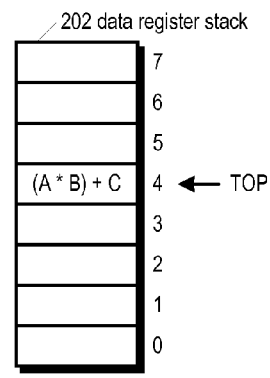

In one embodiment, the "A" and "B" operands are popped off the x87 FPU register stack 202, as shown in FIG. 3. Thus, if the FMA instruction explicitly specifies the x87 FPU register stack 202 register that is two below the TOP, (commonly denoted ST(2)), then the FMA instruction result 218 will be in the TOP register of the x87 FPU register stack 202, as shown in FIG. 3.

Referring now to FIG. 3, a flowchart illustrating operation of the microprocessor 100 of FIG. 1 to execute an FMA instruction according to the present invention is shown. Flow begins at block 302.

At block 302, the instruction decoder 106 decodes an x87 FMA instruction according to the present invention. As described above, the FMA instruction implicitly specifies the first two operands (the factors, "A" and "B") of the FMA operation as being held in the top two registers—ST(0) and ST(1)—of the x87 FPU register stack 202 of FIG. 2 and explicitly specifies the third operand (the addend, "C") as a third register—ST(i)—of the x87 FPU register stack 202. Flow proceeds to block 304.

At block 304, the multiplier 204 of FIG. 2 multiplies the "A" and "B" factor mantissas to generate the product 222 of FIG. 2. Additionally, the adder 206 of FIG. 2 adds the "A" and "B" exponents to generate a sum provided to the control logic 212 of FIG. 2. Flow proceeds to block 306.

At block 306, the adder 216 adds the product 222 to the "C" addend mantissa shifted by the shifter 208 to generate a sum. Additionally, the control logic 212 generates the result 218 exponent and sign based on the "C" exponent and the sum of the "A" and "B" exponents and based on the carry output of the adder 216. Flow proceeds to block 308.

At block 308, the normalize and round circuit 214 of FIG. 2 normalizes and rounds the sum output of the adder 216, as described above with respect to FIG. 2. Advantageously, the normalize and round are postponed until after the addition is performed at block 306, thereby potentially providing a more accurate result 218 than would be achieved by performing distinct multiply, round, and add operations. Flow proceeds to block 312.

At block 312, the result 218 is stored into the register of the x87 FPU register stack 202 explicitly specified as storing the third operand of the FMA instruction, ST(i). In an alternate embodiment, the destination/third operand register is implicitly specified as the register that is two below the TOP of the x87 FPU register stack 202. Flow proceeds to block 314.

At block 314, the x87 FPU 126 pops the top two values from the x87 FPU register stack 202. That is, the "A" and "B" operands are popped off the x87 FPU register stack 202. Thus, if the programmer explicitly specifies the "C" operand register and destination register as the register of the x87 FPU register stack 202 that is two below the TOP, i.e., ST(2), then after the FMA instruction is fully executed the result 218 is located at the TOP of the x87 FPU register stack 202, as shown in the block diagram of FIG. 3. Flow ends at block 314.

It is noted that a program written to perform a series of product accumulations may include a series of three instruction sequences. The three instructions in the sequence are two instructions that push the "A" and "B" operands onto the TOP of the x87 FPU register stack 202 followed by an x87 FMA instruction that explicitly specifies the ST(2) register as the "C" operand and destination register. Alternatively, the program may include a loop whose body includes the three instruction sequence.

As may be observed from the forgoing, an x87 FMA instruction is disclosed that advantageously provides a solution to the problem that the FMA instruction requires three operands to be specified, which is not a feature of x87 instructions. The disclosed x87 FMA instruction solves the problem by implicitly specifying at least two of the operands as being stored in registers on top of the x87 FPU register stack.

Although the present invention and its objects, features, and advantages have been described in detail, other embodiments are encompassed by the invention. For example, although embodiments have been described in which the register of the x87 FPU register stack holding the third operand is explicitly specified in the FMA instruction, embodiments are contemplated in which the ST(2) register of the x87 FPU register stack is implicitly specified as the register holding the third operand and is the destination register of the FMA instruction.

Figure 4:
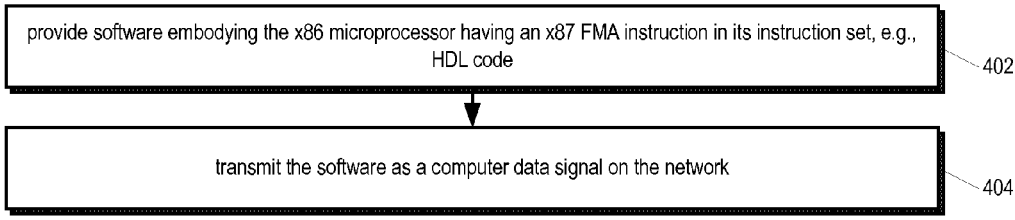
FIG. 4 is a flowchart illustrating a method for providing software for performing the steps of the present invention and subsequently transmitting the software as a computer data signal over a communication network.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the microprocessor described herein by providing the software and subsequently transmitting the software as a computer data signal over a communication network including the Internet and intranets, such as shown in FIG. 4. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An x86 architecture microprocessor having an x87 floating-point unit (FPU) with an x87 register stack, comprising:
   an instruction decoder, configured to decode an x87 fused multiply-add (FMA) instruction of the microprocessor instruction set, wherein said FMA instruction implicitly specifies first and second operands as stored in first and second registers of the register stack, said first and second registers being the top two registers of the register stack, and a third operand, explicitly specified in the instruction as stored in a third register of the register stack;
   a multiplier, coupled to the register stack, configured to multiply said first and second operands to generate a product, in response to said FMA instruction; and
   an adder, coupled to said multiplier, configured to add said third operand to said product to generate a result, in response to said FMA instruction.

2. The microprocessor as recited in claim 1, wherein the microprocessor is further configured to store said result in said third register in said FPU register stack, in response to said FMA instruction.

3. The microprocessor as recited in claim 2, wherein the microprocessor is further configured to pop said first and second operands off the register stack, after storing said result into said third register of the register stack, in response to said FMA instruction.

4. The microprocessor as recited in claim 1, wherein the microprocessor is further configured to pop said first and second operands off the register stack, in response to said FMA instruction.

5. The microprocessor as recited in claim 1, wherein said FMA instruction further comprises:
   an opcode, comprising one of the following hexadecimal values: 0xD9D4, 0xD9D5, 0xD9D6, 0xD9D7.

6. A method for executing an x87 fused multiply-add (FMA) instruction in an x86 architecture microprocessor having an x87 floating-point unit (FPU) with an x87 register stack, comprising:
   decoding the FMA instruction of the microprocessor instruction set, wherein said FMA instruction having implicitly specifies first and second operands as stored in first and second registers of the register stack, said first and second registers being the top two registers of the register stack, and a third operand, explicitly specified in the instruction as stored in a third register of the register stack;
   multiplying said first and second operands to generate a product, after said decoding; and
   adding said third operand to said product to generate a result, after said multiplying.

7. The method as recited in claim 6, further comprising:
   storing said result in said third register in said FPU register stack, after said adding.

8. The method as recited in claim 7, further comprising:
   popping said first and second operands off the register stack, after said storing.

9. The method as recited in claim 6, further comprising:
   popping said first and second operands off the register stack, after said adding.

10. The method as recited in claim 6, wherein said decoding comprises decoding an opcode of the FMA instruction, wherein said opcode comprises one of the following hexadecimal values: 0xD9D4, 0xD9D5, 0xD9D6, 0xD9D7.

11. A computer program product for use with a computing device, the computer program product comprising:
    a computer usable storage medium, having computer readable program code embodied in said medium, for providing an x86 architecture microprocessor having an x87 floating-point unit (FPU) with an x87 register stack, said computer readable program code comprising:
      first program code for providing an instruction decoder, configured to decode an x87 fused multiply-add (FMA) instruction of the microprocessor instruction set, wherein said FMA instruction implicitly specifies first and second operands as stored in first and second registers of the register stack, said first and second registers being the top two registers of the register stack, and a third operand, explicitly specified in the instruction as stored in a third register of the register stack;
      second program code for providing a multiplier, coupled to the register stack, configured to multiply said first and second operands to generate a product, in response to said FMA instruction; and
      third program code for providing an adder, coupled to said multiplier, configured to add said third operand to said product to generate a result, in response to said FMA instruction.

12. The computer program product as recited in claim 11, wherein the microprocessor is further configured to store said result in said third register in said FPU register stack, in response to said FMA instruction.

13. A method for providing an x86 architecture microprocessor having an x87 floating-point unit (FPU) with an x87 register stack, the method comprising:
    providing computer-readable program code describing the microprocessor, the program code comprising:
      first program code for providing an instruction decoder, configured to decode an x87 fused multiply-add (FMA) instruction of the microprocessor instruction set, wherein said FMA instruction implicitly specifies first and second operands as stored in first and second registers of the register stack, said first and second registers being the top two registers of the register stack, and a third operand, explicitly specified in the instruction as stored in a third register of the register stack;

second program code for providing a multiplier, coupled to the register stack, configured to multiply said first and second operands to generate a product, in response to said FMA instruction; and third program code for providing an adder, coupled to said multiplier, configured to add said third operand to said product to generate a result, in response to said FMA instruction; and transmitting the computer-readable program code as a computer data signal on a network.

14. The method as recited in claim 13, wherein the microprocessor is further configured to store said result in said third register in said FPU register stack, in response to said FMA instruction.

15. An x86 architecture microprocessor having an x87 floating-point unit (FPU) with an x87 register stack, comprising:

an instruction decoder, configured to decode an x87 fused multiply-add (FMA) instruction of the microprocessor instruction set, wherein said FMA instruction implicitly specifies first, second, and third operands as stored in first, second, and third registers of the register stack, said first, second, and third registers being the top three registers of the register stack;

a multiplier, coupled to the register stack, configured to multiply said first and second operands to generate a product, in response to said FMA instruction; and an adder, coupled to said multiplier, configured to add said third operand to said product to generate a result for storing in said third register, in response to said FMA instruction.

* * * * *